(12) United States Patent
Rogers

(10) Patent No.: US 11,998,782 B2
(45) Date of Patent: Jun. 4, 2024

(54) FIRE DETECTION AND SUPPRESSION

(71) Applicant: KIDDE TECHNOLOGIES, INC., Wilson, NC (US)

(72) Inventor: Aaron Stanley Rogers, Surf City, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 325 days.

(21) Appl. No.: 16/575,634

(22) Filed: Sep. 19, 2019

(65) Prior Publication Data

US 2021/0086009 A1    Mar. 25, 2021

(51) Int. Cl.
*A62C 37/44*    (2006.01)
*A62C 3/08*    (2006.01)
*G01N 21/77*    (2006.01)

(52) U.S. Cl.
CPC .............. *A62C 37/44* (2013.01); *A62C 3/08* (2013.01); *G01N 21/7703* (2013.01)

(58) Field of Classification Search
CPC ....... A62C 37/44; A62C 3/08; G01N 21/7703
USPC ....................................................... 169/46, 62
See application file for complete search history.

(56) References Cited

U.S. PATENT DOCUMENTS

| | | | |
|---|---|---|---|
| 7,154,388 B2 | 12/2006 | Mazzone | |
| 9,233,264 B2 | 1/2016 | Graham et al. | |
| 9,988,160 B1 | 6/2018 | Clos et al. | |
| 2012/0312562 A1 | 12/2012 | Woehrle et al. | |
| 2013/0312562 A1 | 11/2013 | Prix et al. | |
| 2016/0059059 A1* | 3/2016 | Xin | A62C 37/44 169/61 |

FOREIGN PATENT DOCUMENTS

| | | |
|---|---|---|
| CN | 106823198 A | 6/2017 |
| EP | 2233175 A1 | 9/2010 |
| EP | 3321908 A1 | 5/2018 |
| GB | 2533583 A | 6/2016 |

OTHER PUBLICATIONS

European Search Report; European Application No. 19212797.5; Application Filed: Dec. 2, 2019; Search Report dated Jul. 3, 2020; 9 pages.

* cited by examiner

*Primary Examiner* — Christopher S Kim
(74) *Attorney, Agent, or Firm* — CANTOR COLBURN LLP

(57) ABSTRACT

Systems and methods for a fire suppression system are provided. Aspects include receiving, from a sensor, environmental data associated with a location, determining a presence of a fire and a fire type based at least in part on the environmental data associated with the location, operating a fire suppression system in a plurality of modes based on the presence of the fire and the fire type, wherein the plurality of modes comprise a normal fire operation mode and a hazardous fire operation mode.

9 Claims, 3 Drawing Sheets

FIRE DETECTION AND SUPPRESSION

BACKGROUND

Exemplary embodiments pertain to the art of avionics fire detection and suppression systems and more particularly to a lithium ion battery fire detection and suppression system.

The architecture of aircraft are evolving based on application needs, customer needs, market segments and the availability of advanced technologies. In the process there are attempts to make aircraft more intelligent, more electrical and more data driven. Considering the cost of an aircraft design life cycle and operations, having a modular and re-usable architecture while still maintaining robustness and reliability of the design can be a challenge.

Fires aboard aircraft can pose an imminent danger to operation of the aircraft. With a variety of materials being carried on and/or shipped aboard aircraft, certain fire events can be particularly challenging for fire suppression systems aboard the aircraft. In particular, the popularity of lithium ion battery based electronics increases the chance for a hazardous event on an aircraft. Due to the potential for such a hazard caused by these lithium ion battery fires, there exists a need to outfit aircraft with the means to detect and distinguish these types of fires from other types of fires and also there exists a need for means to extinguish these types of fires without having to retrofit an aircraft with an entirely new fire suppression system.

BRIEF DESCRIPTION

Disclosed is a method for operating a first detection and suppression system in an aircraft that includes receiving, from a sensor, environmental data associated with a location, determining a presence of a fire and a fire type based at least in part on the environmental data associated with the location, operating a fire suppression system in a plurality of modes based on the presence of the fire and the fire type, wherein the plurality of modes comprise a normal fire operation mode and a hazardous fire operation mode.

Disclosed is a fire detection and suppression system for an aircraft. The system includes receiving, from a sensor, environmental data associated with a location, determining a presence of a fire and a fire type based at least in part on the environmental data associated with the location, operating a fire suppression system in a plurality of modes based on the presence of the fire and the fire type, wherein the plurality of modes comprise a normal fire operation mode and a hazardous fire operation mode.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Turning now to an overview of technologies that are more specifically relevant to aspects of the disclosure, fires aboard aircraft can pose an imminent danger to operation of the aircraft. In particular, Lithium Ion battery fires are becoming increasingly prevalent in non-occupied commercial aviation aircraft cargo holds. They are typically classified as two types; (type a) an occasional unintentional transport of a personal electronic device (PED) in the cargo hold by a passenger that does not know the regulations or just has too much luggage to carry on board and (type b) intentional transport and shipment of large quantities of lithium ion batteries by suppliers that are intentionally mislabeling the packaging to avoid the extra expense of hazardous cargo shipping.

The (type a) Lithium Ion battery fire can be deep seated and ignite the normal bulk cargo surrounding it resulting in a fire that if not detected early enough can become more difficult for the currently regulated fire suppression system to suppress or inert. The (type b) Lithium Ion battery fire is much more severe as it cascades a thermal runaway issue associated with Lithium Ion battery fires and will much more quickly become too difficult for the currently regulated fire suppression system to handle.

Turning now to an overview of the aspects of the disclosure, one or more embodiments address the above-described challenges in the art by providing systems and methods for utilizing fiber optic based smoke detection systems with added sensor signature capabilities to be able to detect a lithium ion battery fire signature early. Fire suppression systems within an aircraft can be adapted into a total flooding type of system to rapidly cool and arrest the lithium ion battery fire before it become too difficult to suppress.

Figure 1:
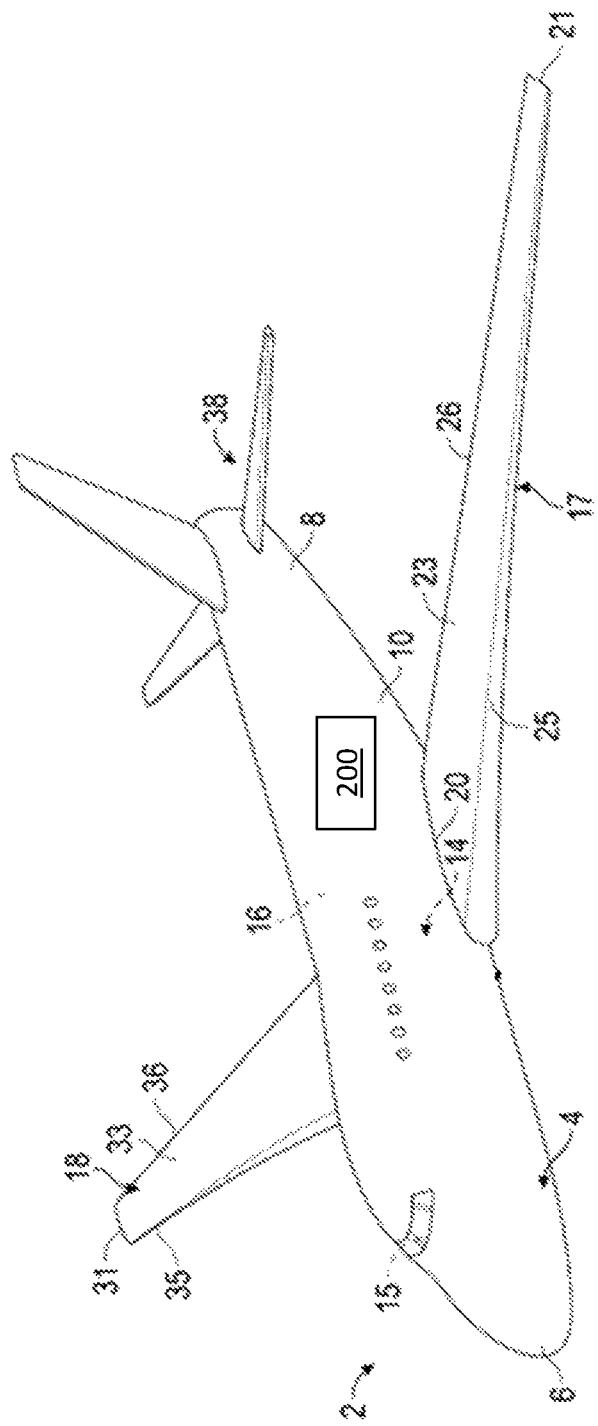
FIG. 1 is a perspective view of an aircraft that may incorporate embodiments of the present disclosure.

Referring now to the figures, FIG. 1 depicts a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger or cargo compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 54 configured to provide propulsion to the aircraft 2.

In embodiments, the aircraft 2 can include a fire detection and suppression system 200. The fire detection and suppression system 200 can be utilized to detect the presence of heat, gases, and/or smoke in the crew compartment 15 and the passenger or cargo compartment 16 or simply the aircraft cabin 14.

Figure 2B:
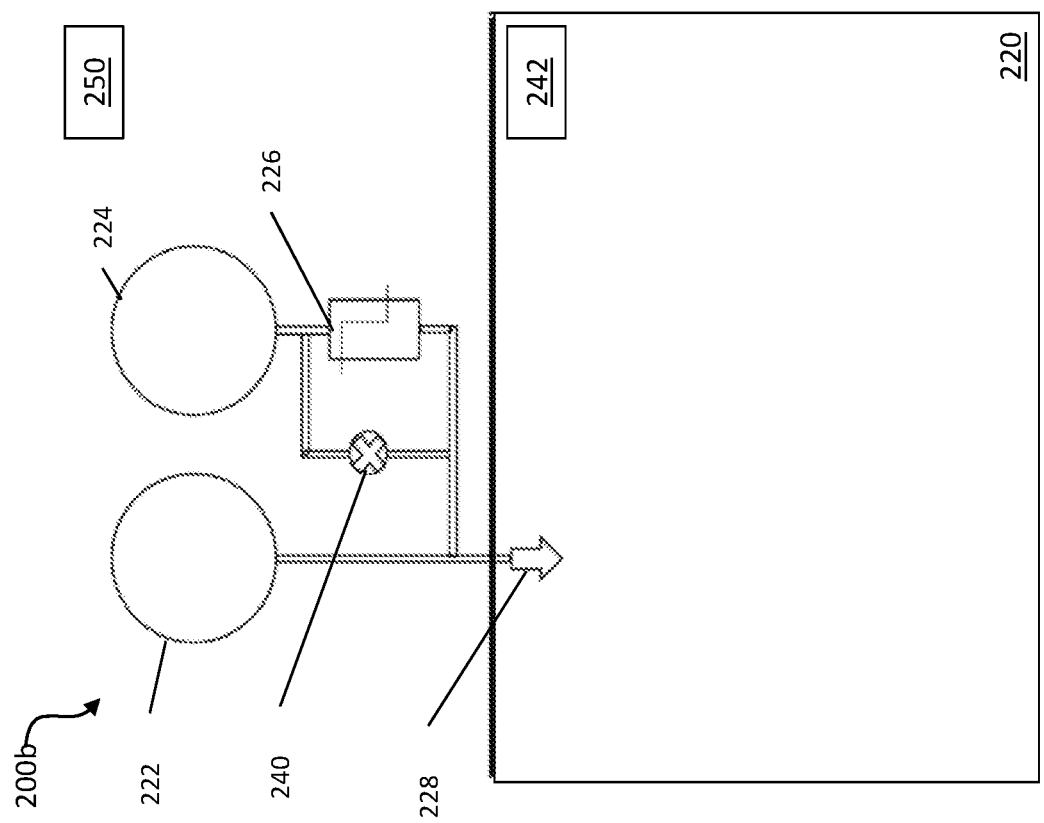
FIG. 2b depicts a system for fire detection and suppression utilizing a bypass valve according to one or more embodiments.
Figure 2A:
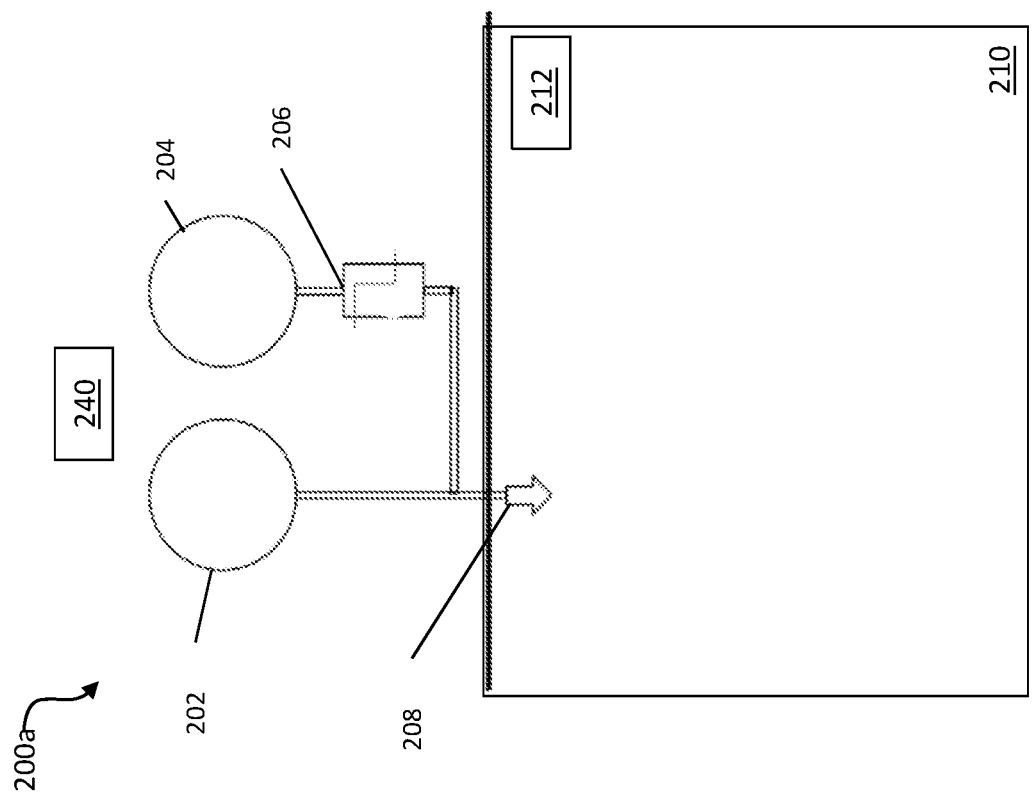
FIG. 2a depicts a system for fire detection and suppression according to one or more embodiments.

Turning now to a more detailed description of aspects of the present disclosure, FIG. 2a depicts a system for fire detection and suppression according to one or more embodiments. The system 200a includes a high rate discharge (HRD) fire extinguisher 202 and one or more low rate discharge (LRD) fire extinguishers 204. The LRD fire extinguishers 204 have their outputs regulated and metered by a Dryer/Meter Unit (DMU) 206. The system 200a also includes piping for transporting a suppression agent from the HRD fire extinguisher 202 and the LRD fire extinguisher 204 to a nozzle or nozzles 208 that protrude into an aircraft compartment 210. The system 200a includes an event detection sensor 212 and a controller 240. In one or more embodiments, the controller 240 is in electronic communication with any or all components of system 200a. For typical fires that can occur in an aircraft compartment 210, the system 200a, upon detection from the event detection sensor 212, can initiate a flooding of the aircraft compartment 210. The flooding occurs with a so-called "knockdown" suppression action which includes releasing the fire suppression agent from the HRD fire extinguisher 202 into the aircraft compartment 210 through the piping and nozzle 208. The HRD fire extinguisher 202 can be kept pressurized allowing the discharge of the fire suppression agent into the aircraft compartment 210 within a short time period (e.g., few seconds to about a minute). The quantity of the suppression agent in the HRD fire extinguisher 202 can be pre-calculated to provide a desired concentration level within the aircraft compartment 210. The concentration level of the fire suppression agent is then maintained within the aircraft compartment 210 for a set period of time during a so-called "soak" period or phase. During the "soak" period or phase, the LRD fire extinguisher 204 outputs a metered and regulated amount of fire suppression agent during the period to maintain the fire suppression agent concentration within the aircraft compartment 210. This metering and regulating are performed by the DMU 206 which can be controlled by the controller 240. The "soak" period is to ensure that the oxygen level in the compartment is inerted such that the fire event cannot reflash or experience a re-ignition event.

In one or more embodiments, the system 200a can be utilized for typical fire suppression within an aircraft compartment. However, certain types of fires require different techniques for suppression that do not follow the traditional knock-down and soak periods or phases. For example, a fire that is ignited from a lithium-ion battery requires a different operation than a traditional fire. FIG. 2b depicts a system 200b for fire detection and suppression utilizing a bypass valve according to one or more embodiments. In one or more embodiments, the system 200b includes similar components from the system 200a from FIG. 2b. These components of the system 200b include an HRD fire extinguisher 222 tank, one or more LRD fire extinguisher 224 tanks, and a DMU 226. The system 200b is configured to provide fire suppression to the aircraft compartment 220. The system 200b is also configured to operate in a similar manner as system 200a for suppressing typical fires by providing a fire suppression agent through a nozzle or nozzles 228 during a "knock-down" and "soak" period or phase. The system 200b includes a bypass valve 240 which controls fire suppression agent output from the LRD fire extinguisher 224. The bypass valve 240 bypasses the DMU 226 to provide piping from the LRD fire extinguisher 224 to the nozzle 228 inside the aircraft compartment 220. The system 200b also includes an event detection sensor 242 and a controller 250. The controller 250 can be in electronic communication with any or all of the components in the system 200b. In one or more embodiments, a duct system including several lines is utilized to allow for flow of the fire suppression agent into the compartment 220. Any number of lines can be utilized for this. In the illustrated example in FIG. 2b, a first line connects the HRD fire extinguisher 222 to the nozzle 228, a second line connects the LRD fire extinguisher 224 to the nozzle with the dryer/meter unit 226 interposed between the LRD fire extinguisher 224 and the nozzle 228, and a third line connects the LRD fire extinguisher 224 to the nozzle 228 where the bypass valve 240 is interposed between the LRD fire extinguisher 224 and the nozzle 228.

In one or more embodiments, the controller 250 can communicate with the fire detection sensor 242 to determine how to operate the fire detection and suppression system 200b based on the type of fire detected in the aircraft compartment 220. For typical fires, the system 200b can operate utilizing a knockdown and inerting operation as described in detail above with regards to the system 200a in FIG. 2a. However for specialty type fires (e.g., lithium ion battery fires), the controller 250 can operate the system 200b to provide for rapid cooling and total flooding of the aircraft compartment 220. To achieve this, the HRD fire extinguisher 222 is output into the compartment 220 initially. Upon total discharge of the HRD fire extinguisher 222, the LRD fire extinguisher 224 will be discharged except the bypass valve 240 will be opened to allow for the free (i.e., unmetered and unregulated) flow of fire suppression agent from the LRD fire extinguisher 224 into the aircraft compartment 220. In one or more embodiments, the specialty fire type refers to fires caused due to ignition of a lithium ion battery. This type of fire is extremely hazardous for aircraft operation and requires rapid cooling (thermal energy suppression) and total flooding to more effectively arrest the fire due to the potential for thermal runaway of the lithium ion battery.

In one or more embodiments, the fire type, which can determine operation of the system 200b, is determined by the controller 250 in communication with the event detection sensor 242. In one or more embodiments, the event detection sensor 212 and 242 can be any type of fire, smoke, and/or gas detection sensor including, but not limited to, a fiber optic detection sensor. The event detection sensors can be distributed throughout the aircraft compartment 220. The fiber optic event detection sensors through chemical or mechanical modification of the fibers, can be adapted to be able to detect lithium ion fire gas emissions such as, carbon monoxide (CO), carbon dioxide (CO2), hydrogen fluoride (HF), and Phosphoryl Fluoride (POF3) as well as an infrared thermal energy (i.e., heat) signatures. The combination of smoke, gas, and heat signatures can then be processed by the controller 250 utilizing signature trending and weighting algorithms to provide early detection of a lithium ion battery fire event. A number of fiber optic gas detection techniques have been matured to accomplish the specific gas detection portion of the above referenced algorithm. These include, for example, direct gas absorption, Raman Scattering, Fluorescence, Surface Plasmon resonance and mechanical deformation due to a gas-fiber coating reaction.

Fiber optic sensing can take advantage of different signal bias/monitoring techniques to extract different information from the active sensing portions of the fiber optic sensing cable. In some embodiments, the gas sensing will be processed at the end of the cable by one of the primary means mentioned above such as, for example, Fluorescence or other light modification due to a special fiber optic coating at the end of the fiber optic cable. Additionally, by applying a bias technique such as, for example, Raman Scattering, a heat signature can be extracted to determine the thermal rate of rise in the local vicinity of the fire threat. The controller 250 can then utilize those basic inputs and scale them against a weighted look up table to determine the fire type and thus discriminate against a lithium ion battery fire signature and a bulk cargo fire signature to determine the proper course of fire extinguishing action. The specific lithium ion battery fire signature is determined from a series of laboratory fire events based on the worse case permitted or anticipated cargo loading.

In one or more embodiments, the fire suppression agent utilized in system 200a and system 200b can be any suitable fire suppression agent including, but not limited to, Bromotrifluoromethane (sometimes referred to as, "Halon 1301"). In some embodiments, the compartments 210 and 220 can be the aircraft cabin (14 from FIG. 1) as well as the crew and passenger or cargo compartment (15 and 16 from FIG. 1). In other embodiments, the compartments 210 and 220 can be any location that stores and/or transports lithium ion batteries. In one or more embodiments, the system 200b can generate an alert or signal to alert a flight crew or any other person or system associated with the compartment 220. In the case of a flight crew on an aircraft, the signal will alert the crew to diver the aircraft and land immediately based on determining that the fire is lithium ion battery fire (i.e., hazardous).

In embodiments, the controllers 240 and 250 and any of the hardware referenced in the system 200a, 200b can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form. Additionally, a network can be utilized for electronic communication between and among the controllers 240, 250 and other devices in the systems 200a, 200b. The network can be in wired or wireless electronic communication with one or all of the elements of the system 200a, 200b. Cloud computing can supplement, support or replace some or all of the functionality of the elements of the system 200a, 200b. Additionally, some or all of the functionality of the elements of system 200a, 200b can be implemented as a cloud computing node. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 3:
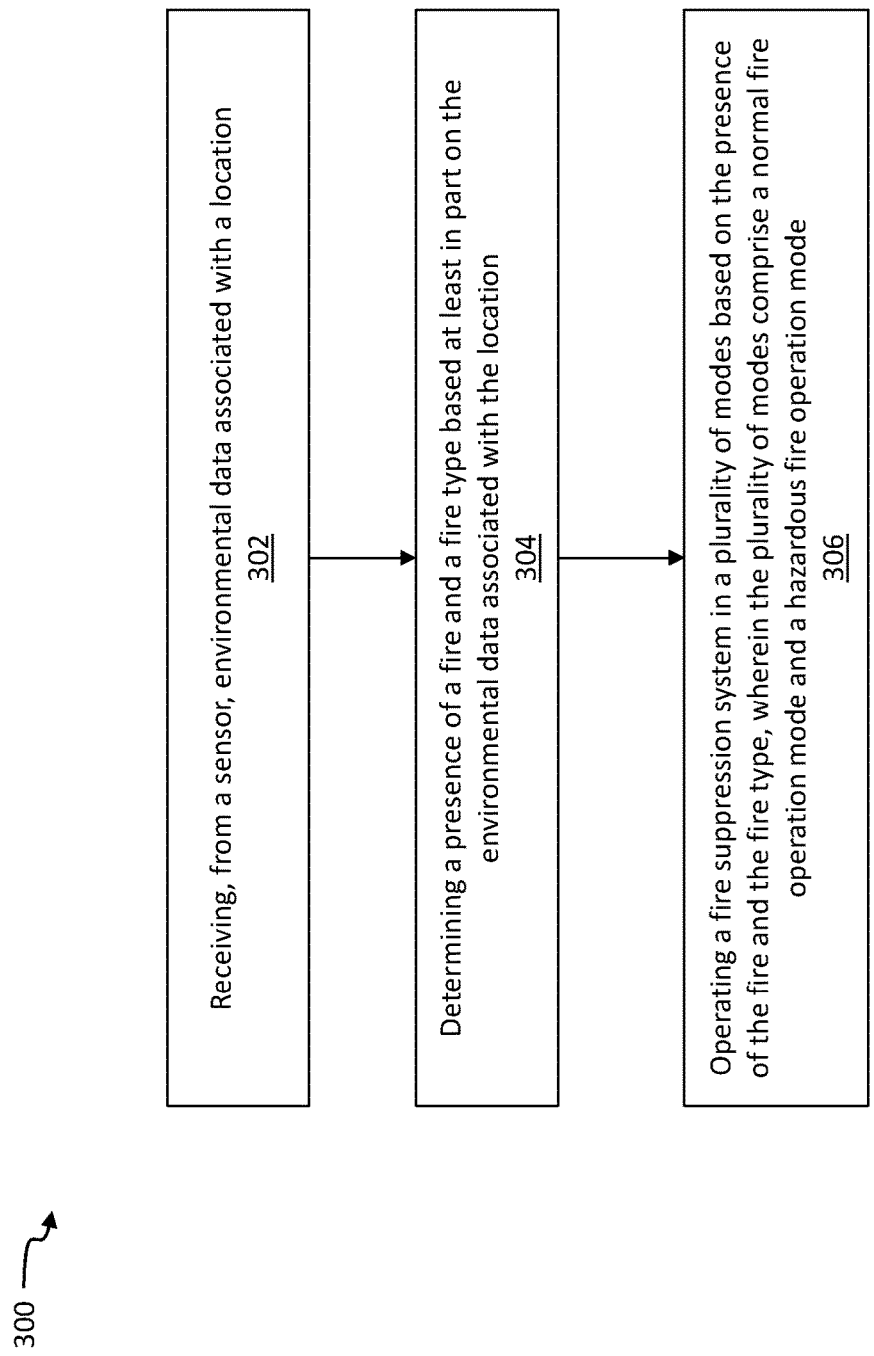
FIG. 3 depicts a flow diagram of a method for operating a fire suppression system according to one or more embodiments.

FIG. 3 depicts a flow diagram of a method for operating a fire suppression system according to one or more embodiments. The method 300 includes receiving, from a sensor, environmental data associated with a location, as shown at block 302. The method 300, at block 304, includes determining a presence of a fire and a fire type based at least in part on the environmental data associated with the location. And at block 306, the method 300 includes operating a fire suppression system in a plurality of modes based on the presence of the fire and the fire type, wherein the plurality of modes comprise a normal fire operation mode and a hazardous fire operation mode.

Additional processes may also be included. It should be understood that the processes depicted in FIG. 3 represent illustrations and that other processes may be added or existing processes may be removed, modified, or rearranged without departing from the scope and spirit of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for operating a fire suppression system, the method comprising:
   receiving, from a sensor, environmental data associated with a location;
   determining a presence of a fire;
   determining whether the fire is a lithium ion battery fire or is not a lithium ion battery fire, based at least in part on a gas emission signature in the location, wherein determining whether the fire is a lithium ion battery fire or is not a lithium ion battery fire includes:
      analyzing the gas emission signature to determine a presence of lithium ion fire gas emissions; and
      based on determining the presence of the lithium ion fire gas emissions,
   operating a fire suppression system in:
      a first fire operation mode used when the lithium ion fire gas emissions are not present; or
      operating the fire suppression system in a lithium ion battery fire operation mode when the lithium ion fire gas emissions are present.

2. The method of claim 1, wherein the fire suppression system comprises a first fire extinguisher, a second fire extinguisher, a dryer/meter unit, a nozzle, a bypass valve, and a duct system;
   wherein the duct system comprises:
      a first line connecting the first fire extinguisher to the nozzle;
      a second line connecting the second fire extinguisher to the nozzle, wherein the dryer/meter unit is interposed between the second fire extinguisher and the nozzle in the second line;

a third line connecting the second fire extinguisher to the nozzle, wherein the bypass valve is interposed between the second fire extinguisher and the nozzle in the third line;

wherein the fire suppression system is configured to discharge a fire suppression agent into the location through the nozzle; and wherein the fire suppression agent is stored in the first fire extinguisher and the second fire extinguisher.

3. The method of claim 2, wherein operating the fire suppression system in the lithium ion battery fire operation mode comprises:

discharging the fire suppression agent from the first fire extinguisher through the first line and nozzle;

engaging the bypass valve to discharge the fire suppression agent from the second fire extinguisher through the third line and nozzle.

4. The method of claim 2, wherein operating the fire suppression system in the first fire operation mode comprises:

discharging the fire suppression agent from the first fire extinguisher through the first line and nozzle;

discharging the fire suppression agent from the second fire extinguisher through the second line and nozzle; and operating the dryer/meter unit to regulate a flow of the fire suppression agent through the second line.

5. The method of claim 1, wherein the environmental data associated with the fire comprises an infrared thermal energy signature.

6. The method of claim 5, wherein the algorithm comprises one or more of direct gas absorption, Raman Scattering, Fluorescence, and Surface Plasmon resonance.

7. The method of claim 1, wherein the sensor comprises an fiber optic detection sensor.

8. The method of claim 1, further comprising generating an alert.

9. The method of claim 1, wherein the location comprises an aircraft compartment.

\* \* \* \* \*